(12) United States Patent
Sun et al.

(10) Patent No.: US 8,209,962 B2
(45) Date of Patent: Jul. 3, 2012

(54) DIESEL PARTICULATE FILTER SOOT PERMEABILITY VIRTUAL SENSORS

(75) Inventors: Min Sun, Windsor (CA); Houshun Zhang, Canton, MI (US); Zornitza Pavlinova Pavlova-MacKinnon, Farmington Hills, MI (US); Kevin Dean Sisken, Saline, MI (US)

(73) Assignee: Detroit Diesel Corporation, Detroit, MI (US)

( * ) Notice: Subject to any disclaimer, the term of this patent is extended or adjusted under 35 U.S.C. 154(b) by 3 days.

(21) Appl. No.: 11/237,464

(22) Filed: Sep. 28, 2005

(65) Prior Publication Data

US 2007/0068147 A1     Mar. 29, 2007

(51) Int. Cl.
*F01N 3/00*     (2006.01)
(52) U.S. Cl. ........... 60/295; 60/274; 60/297; 60/311
(58) Field of Classification Search ........... 60/274, 60/276, 277, 295, 297, 311; 55/DIG. 30, 55/523; 73/118.1, 118.2
See application file for complete search history.

(56) References Cited

U.S. PATENT DOCUMENTS

| | | | |
|---|---|---|---|
| 5,196,170 A | 3/1993 | Patashnick et al. | |
| 5,279,970 A | 1/1994 | Patashnick et al. | |
| 5,299,140 A * | 3/1994 | Ankeny et al. | 702/30 |
| 5,401,468 A | 3/1995 | Patashnick et al. | |
| 5,511,413 A * | 4/1996 | Pfister et al. | 73/118.1 |
| 5,861,750 A * | 1/1999 | Anderson et al. | 324/347 |
| 6,377,171 B1 * | 4/2002 | Fewel | 340/522 |
| 6,405,528 B1 * | 6/2002 | Christen et al. | 60/295 |
| 6,576,045 B2 | 6/2003 | Liu et al. | |
| 6,622,480 B2 * | 9/2003 | Tashiro et al. | 60/295 |
| 6,673,414 B2 | 1/2004 | Ketcham et al. | |
| 6,756,904 B2 * | 6/2004 | Kinugawa et al. | 340/606 |
| 6,820,418 B2 * | 11/2004 | Nakatani et al. | 60/297 |
| 6,912,847 B2 * | 7/2005 | Deeba | 60/297 |
| 6,941,750 B2 * | 9/2005 | Boretto et al. | 60/297 |
| 6,966,178 B2 * | 11/2005 | Saito et al. | 60/295 |

* cited by examiner

*Primary Examiner* — Thomas Denion
*Assistant Examiner* — Diem Tran
(74) *Attorney, Agent, or Firm* — Bill C. Panagos; Rader, Fishman & Grauer PLLC

(57) ABSTRACT

A system and method for controlling an internal combustion engine senses differential pressure across the diesel particulate filter to monitor at least one of soot cake permeability and filter wall permeability as a function of exhaust temperature and mass flow velocity. The system and method preferably respond to both porous wall and soot cake permeabilities to determine when the soot level matches a threshold at which an operator may be warned, or at which a remedial operation may be triggered, or at which a more protective action taken by the engine control module.

7 Claims, 3 Drawing Sheets

DIESEL PARTICULATE FILTER SOOT PERMEABILITY VIRTUAL SENSORS

STATEMENT REGARDING FEDERALLY SPONSORED RESEARCH OR DEVELOPMENT

The invention was made with Government support under Contract No. DE-CE02-99EE50575. The Government has certain rights to the invention.

BACKGROUND OF THE INVENTION

1. Field of the Invention

The present invention relates to a system and method for monitoring soot build up in a diesel particulate filter of an internal combustion engine based on engine operating parameters.

2. Background Art

A number of strategies have been developed to reduce emissions for truck, automotive, and stationary engines used in power plants. In addition to controlling the basic combustion process using an electronic control module to balance trade-offs between performance and emissions, emission control devices are often placed in the exhaust stream to reduce or eliminate the byproducts of incomplete combustion. A particulate trap or filter is an emission control device placed in the exhaust stream to reduce particulate emissions, which are primarily carbon particles or soot. As more particulates accumulate in the filter or trap, the increasing restriction to exhaust flow results in a gradual increase in exhaust back pressure, i.e. the pressure within the exhaust upstream of the filter. If the trap is not properly maintained or if engine conditions prevent the trap from being regenerated, the exhaust back pressure may increase to a point which could jeopardize engine component life.

Diesel engine exhaust systems include particulate filters, catalyzed soot filters, and NOx adsorber catalysts that clean exhaust and reduce engine emissions. There is a need to regenerate and desulfate exhaust system components on a regular basis for efficient operation.

Regeneration of diesel particulate filters requires heating the filters to temperatures above 450° C. for a period depending on filter size, type, soot amount and regeneration conditions, for example, for a diesel truck highway operation engine operating normally, for about 10 minutes to over 1 hour.

The monitoring and control of a need for regeneration may be important but difficult to do. The monitoring of pressure in the diesel particulate filter has not been relied upon or easy to incorporate in the monitoring function in previously known systems.

SUMMARY OF THE INVENTION

The present invention overcomes the above-mentioned disadvantages by providing a system and method for determining soot mass based on the pressure differential across the diesel particulate filter a differential pressure may be measured with a pressure differential sensor or with two pressure sensors, or an estimator with one pressure sensor and a calculator, preferably a processing automatically performed by an electronic control module, such as an engine control module for a truck. At least one of soot cake permeability and filter wall permeability is formulated for resolution of the diesel particulate filter soot build up as a function of pressure differential across the diesel particulate filter (DPF). The present invention provides a system and method for alerting an operator and/or maintenance personnel and/or otherwise responding to an increased need for corrective action, so that regeneration can be initiated before component damage occurs. In addition, the present invention provides a method for detection and initialization of automatic DPF regeneration by active and forced procedures as a result of control algorithm processing by means of a correlator in the processor that relies upon look up tables or equivalents.

In the preferred embodiment, a system and method for controlling an internal combustion engine formulizes both porous wall permeability and soot cake permeability. Each of the permeabilities are preferably derived as a function of exhaust temperature and mass flow velocity, and the pressure differential across the diesel particulate filter. The control may be used with the present invention to warn the operator when permeability is reduced below a first threshold to provide an opportunity to take corrective action. If the condition is not corrected, the control may trigger responses such as available engine torque is reduced. Alternatively, the control may induce regeneration heating as a response.

A preferred formulization includes defining porous wall permeability as a function of pore diameter, exhaust gas temperature, and volumetric exhaust flow rate (space velocity). Another preferred formulization defines soot cake permeability as a function of soot cake temperature and volumetric exhaust flow rate and/or space velocity which is the volumetric flow rate divided by the catalyst (filter) volume.

BRIEF DESCRIPTION OF THE DRAWINGS

The advantages of the present invention will be more readily apparent from the following detailed description of the best mode for carrying out the invention when read in connection with the accompanying drawing in which like reference numerals refer to like parts throughout the views and in which.

DETAILED DESCRIPTION OF THE PREFERRED EMBODIMENT(S)

Figure 1:
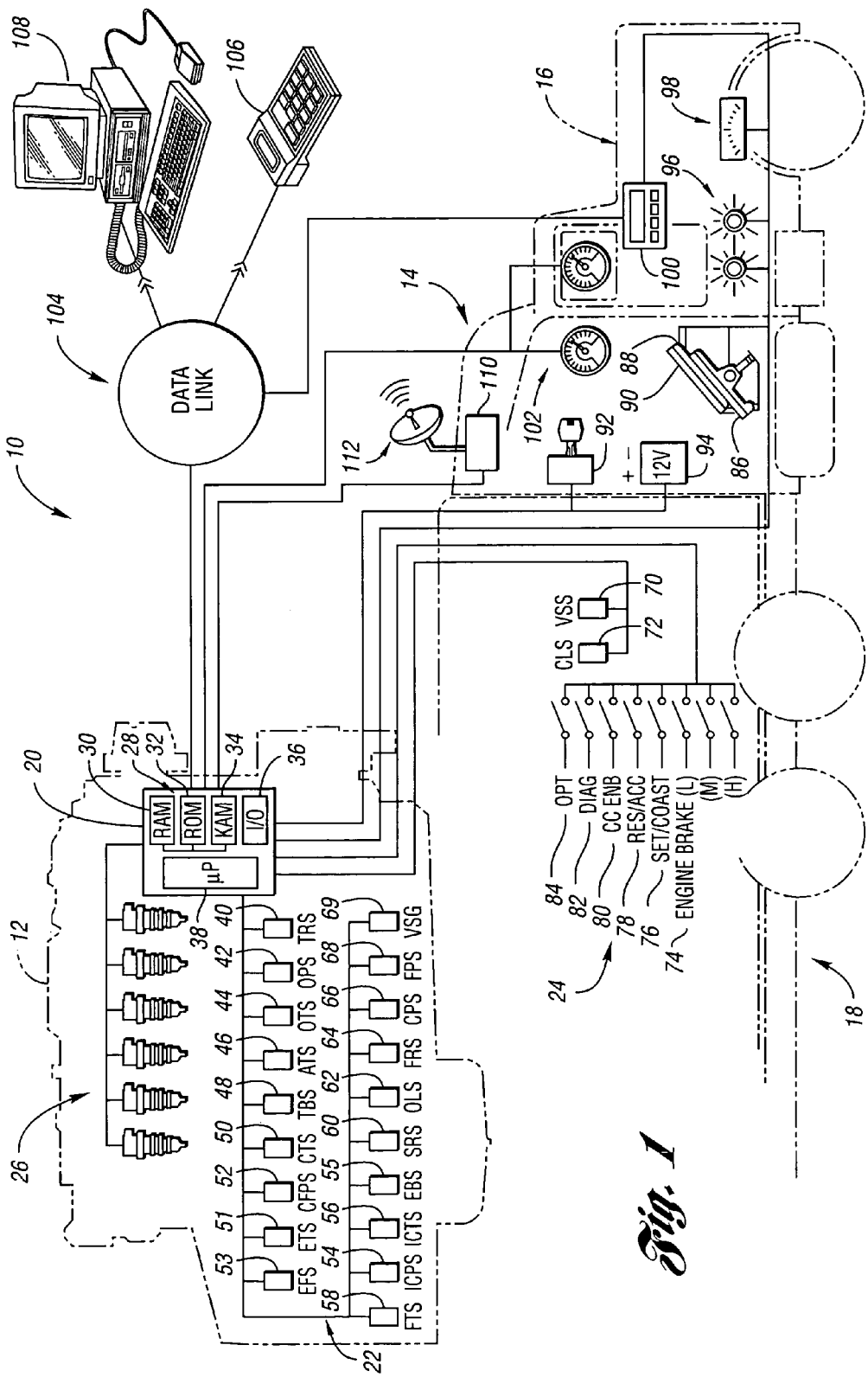
FIG. 1 is a block diagram illustrating one application of a system or method for controlling an engine in response to exhaust back pressure according to one embodiment of the present invention.

FIG. 1 provides a schematic/block diagram illustrating operation of a system or method for controlling an engine based on exhaust back pressure to reduce or prevent component damage in a representative application according to one embodiment of the present invention. System 10 includes a multi-cylinder compression ignition internal combustion engine, such as a diesel engine 12, which may be installed in a vehicle 14 depending upon the particular application. In one embodiment, vehicle 14 includes a tractor 16 and semi-trailer 18. Diesel engine 12 is installed in tractor 16 and interfaces with various sensors and actuators located on engine 12, tractor 16, and semi-trailer 18 via engine and vehicle wiring harnesses as described in further detail below. In other applications, engine 12 may be used to operate industrial and construction equipment, or in stationary applications for driving generators, compressors, and/or pumps and the like. While the present invention is described with reference to a diesel engine, one of ordinary skill in the art will recognize that the present invention is not necessarily limited to compression ignition engines and may be applied to a variety of internal combustion engine technologies.

An electronic engine control module (ECM) 20 receives signals generated by engine sensors 22 and vehicle sensors 24 and processes the signals to control engine and/or vehicle actuators such as fuel injectors 26. ECM 20 preferably includes computer-readable storage media, indicated generally by reference numeral 28 for storing data representing instructions executable by a computer to control engine 12. Computer-readable storage media 28 may also include calibration information in addition to working variables, parameters, and the like. In one embodiment, computer-readable storage media 28 include one or more of random access memory (RAM) 30 as well as various non-volatile memory such as read-only memory (ROM) 32, and keep-alive or non-volatile memory (KAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, and the like.

In a typical application, ECM 20 processes inputs from engine sensors 22, and vehicle sensors/switches 24 by executing instructions stored in computer-readable storage media 28 to generate appropriate output signals for control of engine 12. In one embodiment of the present invention, engine sensors 22 include a timing reference sensor (TRS) 40 which provides an indication of the crankshaft position and may be used to determine engine speed. An oil pressure sensor (OPS) 42 and oil temperature sensor (OTS) 44 are used to monitor the pressure and temperature of the engine oil, respectively.

An air temperature sensor (ATS) 46 is used to provide an indication of the current intake air temperature. A turbo boost sensor (TBS) 48 is used to provide an indication of the boost pressure of a turbocharger which is preferably a variable geometry or variable nozzle turbocharger as described in greater detail below. Coolant temperature sensor (CTS) 50 is used to provide an indication of the coolant temperature. Depending upon the particular engine configuration and application, various additional sensors may be included. For example, engines which utilize exhaust gas recirculation (EGR) preferably include an EGR temperature sensor (ETS) 51 and an EGR flow sensor (EFS) 53.

Applications utilizing a common rail fuel system may include a corresponding fuel pressure sensor (CFPS) 52. Similarly, an intercooler coolant pressure sensor (ICPS) 54 and temperature sensor (ICTS) 56 may be provided to sense the pressure and temperature of the intercooler coolant. According to the present invention, a detector 188, for example an exhaust back pressure sensor (EBS) 55 for monitoring exhaust back pressure, provides a signal input to the controller. The sensor 55 may be placed directly in the exhaust or fluidly coupled to the exhaust as illustrated and described with reference to FIG. 3. Alternatively, a differential pressure sensor 190, or two pressure sensors 196, 198 in communication with opposite ends of the filter may provide input to the control system processor. Engine 12 also preferably includes a fuel temperature sensor (FTS) 58 and a synchronous reference sensor (SRS) 60, which provides an indication of a specific cylinder in the firing order for engine 12. This sensor may be used to coordinate or synchronize control of a multiple-engine configuration such as used in some stationary generator applications. An EGR cooler and corresponding temperature sensor may also be provided to cool recirculated exhaust gas prior to introduction to the engine intake depending upon the particular application.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and low engine fueling. Similarly, a crankcase pressure sensor (CPS) 66 provides an indication of crankcase pressure which may be used for various engine protection features by detecting a sudden increase in crankcase pressure indicative of an engine malfunction.

As one of ordinary skill in the art will appreciate, depending upon the particular application, various sensors may be omitted. In addition, controller 20 preferably includes a number of analog, digital, and/or configurable inputs and outputs which may be used to connect various sensors and/or actuators. Likewise, some applications may use the same wiring harness connectors for alternative placement or retrofitting of sensors and/or actuators. For example, EBS 55 may be connected to any of the sensor inputs in place of a sensor not used in a particular application as desired by the customer. In one embodiment, EBS 55 is connected to the wiring harness in place of a variable speed governor (VSG) 69 or in place of an ambient air temperature sensor (not specifically illustrated) in existing control systems.

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84. ECM 20 also receives signals associated with an accelerator or foot pedal 86, a clutch 88, and a brake 90. ECM 20 may also monitor position of a key switch 92 and a system voltage provided by a vehicle battery 94.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, engine warnings or faults, and the like. Preferably, data link 104 conforms to SAE J1939 and SAE J1587 to provide various service, diagnostic, and control information to other engine systems, subsystems, and connected devices such as display 100. Preferably, ECM 20 may include control logic to reduce engine output when exhaust back pressure exceeds a calibratable threshold according to the present invention to reduce or eliminate the potential for engine damage due to excessive back pressure. The ECM 20 may also generate output signals responsive to back pressure, sensed differential pressure or calculated differential pressure across the diesel particulate filter (DPF) to generate proactive system operations. For example, the control may trigger regeneration heaters 181 to control the soot build up, preferably operating them at a predetermined operation cycle or for a predetermined duration, when a threshold level is detected.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive various information relative to operation of engine 12, and/or vehicle 14.

Figure 2:
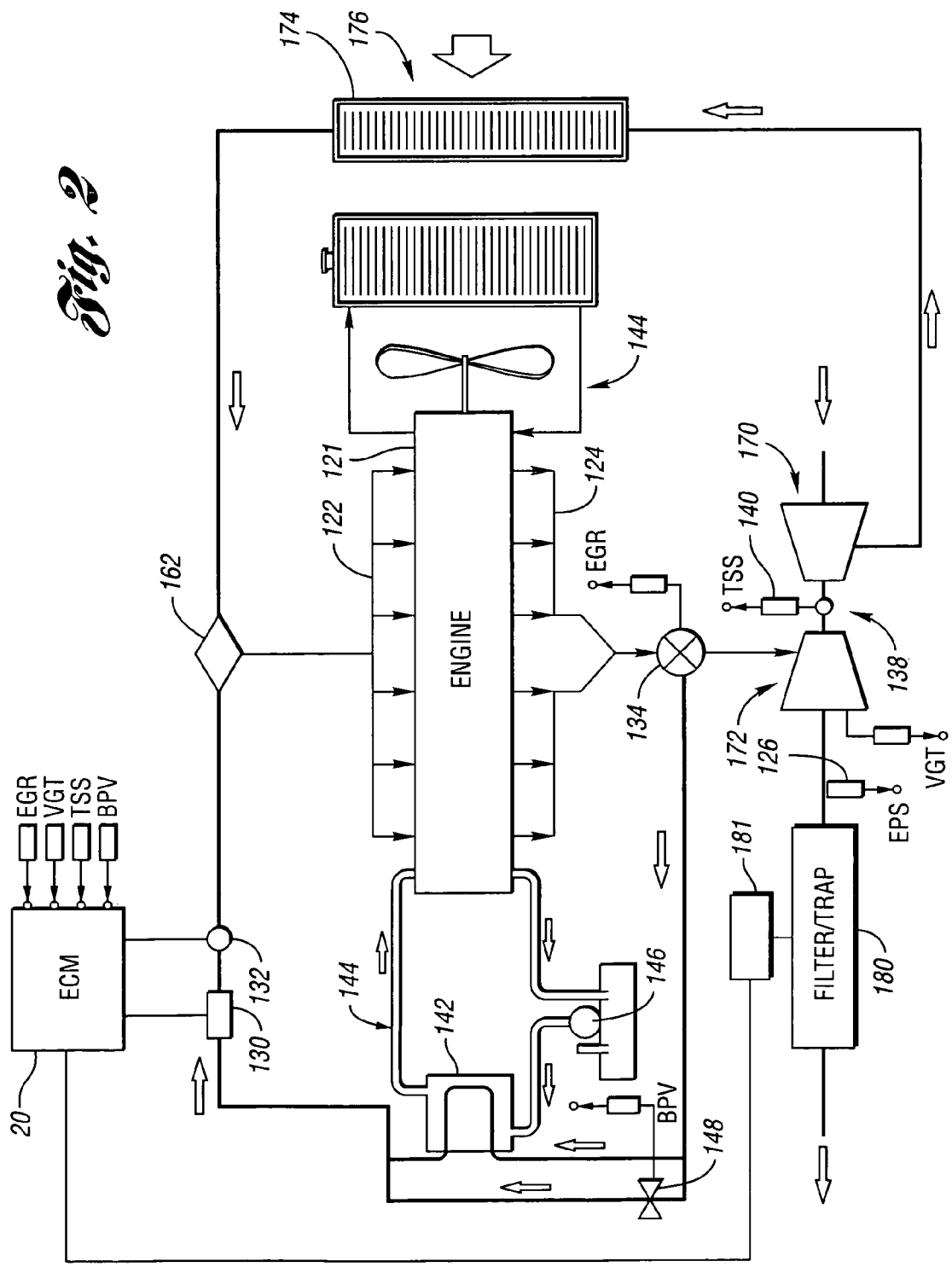
FIG. 2 is a schematic block diagram illustrating a detector of exhaust back pressure in a compression ignition internal combustion engine according to one embodiment of the present invention.

FIG. 2 is a block diagram illustrating a representative engine control system with associated exhaust detector and emission control devices in communication with an ECM having control logic according to one embodiment of the present invention. Engine 12 includes an intake manifold 122, an exhaust manifold 124, and an exhaust back pressure sensor (EBS) 126. An engine control module (ECM) 20 includes stored data representing instructions and calibration information for controlling engine 120. ECM 20 communicates with various sensors and actuators including EBS 126, EGR flow sensor 130 and EGR temperature sensor 132, for example. ECM 20 preferably controls engine 120 in response to various sensors, including EBS 126. ECM 20 may control one or more engine components or devices in response to increased back pressure indicated by EBS 126 and current operating conditions to reduce or maintain exhaust back pressure at an acceptable level. For example, ECM 20 may control a variable nozzle or variable geometry turbocharger (VGT) 138 and monitor an associated turbo speed sensor 140 and turbo boost sensor as described with reference to FIG. 1. Likewise, engine braking level may be controlled or limited to reduce or prevent excessive exhaust back pressure which may be caused by any of a number of problems.

Engine 12 may also include an EGR flow sensor 130 and temperature sensor 132 downstream of an EGR cooler 142 which is connected to the engine coolant circuit 144, which includes a water or coolant pump 146 for circulating engine coolant. An EGR cooler bypass valve (BPV) 148 may be selectively operated by ECM 20 to control temperature of the EGR flow by diverting none, some, or all of the EGR flow from EGR valve 134 around EGR cooler 142.

In operation, ECM 20 controls engine 12 based on current operating conditions and calibration information to reduce or eliminate excessive exhaust back pressure as monitored by EBS 126. In one preferred embodiment, engine 120 is a 6-cylinder compression-ignition internal combustion engine. ECM 20 of the preferred embodiment includes control logic to monitor current engine control parameters and operating conditions and may limit output speed or torque based on exhaust back pressure exceeding a calibratable threshold. Likewise, various engine systems or subsystems may be controlled in an attempt to prevent excessive back pressure.

During operation of engine 12, intake air passes through compressor portion 170 of VGT 138 which is powered by turbine portion 172 via hot exhaust gasses. Compressed air travels through charge air cooler 174 which is preferably an air-to-air cooler cooled by ram air 176. Charge air passes through cooler 174 to mixer 162 which is preferably a pipe union where it is combined with recirculated exhaust gas based on current engine operating conditions. Exhaust gas exiting engine 12 through exhaust manifold 124 passes through EGR valve 134 where a portion of the exhaust gas may be selectively diverted through EGR cooler 142. Valve 148 is selectively operated to divert a portion (none, some, or all) of the diverted exhaust gas around cooler 142 to adjust the temperature of the recirculated exhaust gas. The EGR flows past EGR flow sensor 130 and temperature sensor 132 to mixing valve 162 where it is combined with compressed charge air.

The majority of the exhaust gasses not diverted by EGR valve 134 pass through turbine portion 172 of VGT 138, one or more emission control devices such as a particulate trap or filter 180, before being exhausted to atmosphere. As particulate filter/trap 180 accumulates particles from the exhaust stream, flow will be impeded and exhaust pressure between manifold 124 and atmosphere will increase. Preferably, at least one pressure sensor such as EBS 126 is positioned in the exhaust, or is fluidly coupled to the exhaust or components subjected to exhaust pressure, to provide an indication of exhaust pressure.

Figure 3:
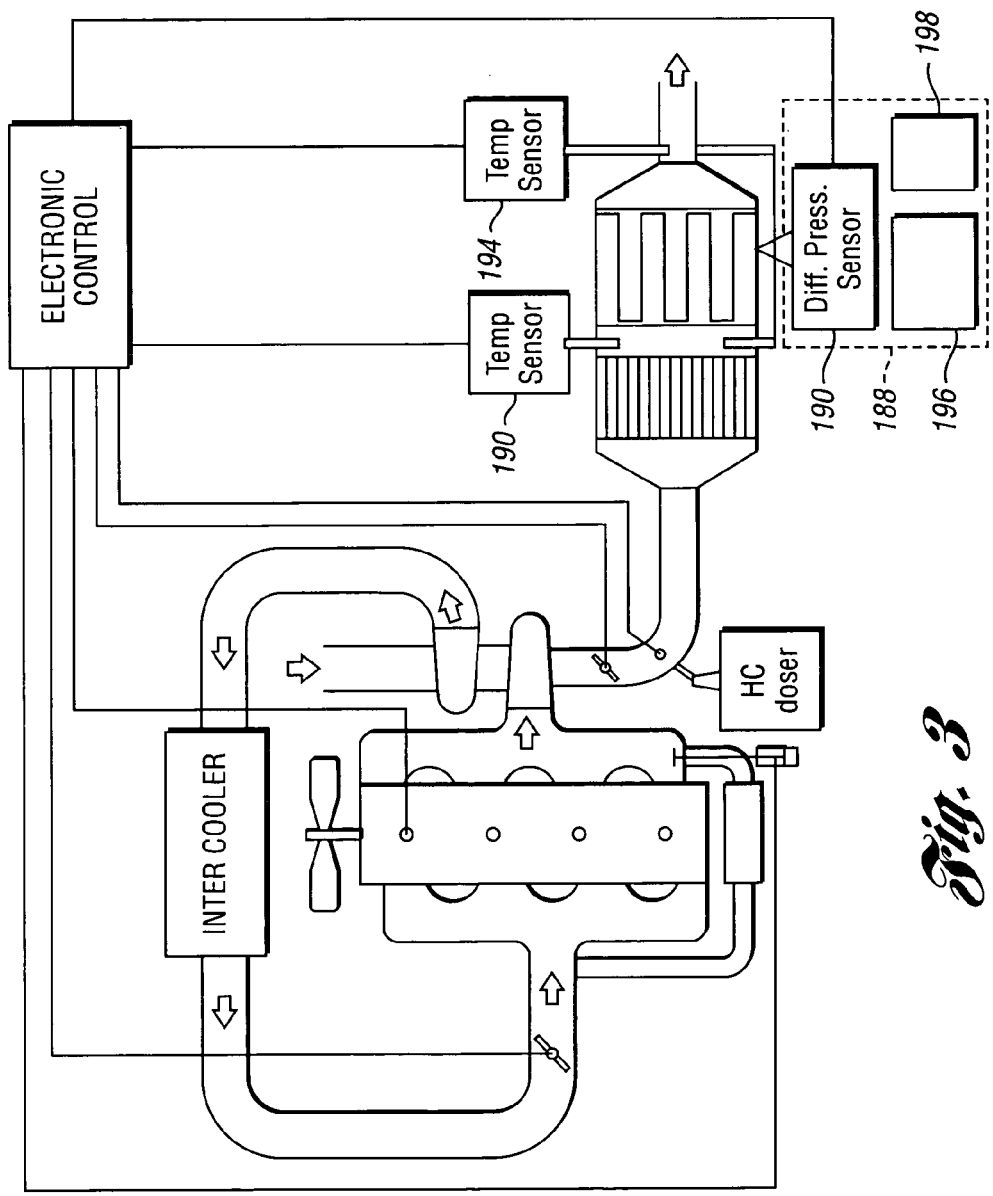
FIG. 3 is a diagrammatic view of a diesel particulate filter and related sensors according to the present invention.

The preferred embodiment of the present invention uses a differential pressure monitor as shown in FIG. 3 for strategies for estimating or predicting current operating conditions without directly measuring soot build up. Depending on the particular application, the positioning of one or more pressure sensors may vary. For example, to monitor the VGT or engine braking performance, a pressure sensor could be placed upstream of the VGT, i.e. between the exhaust manifold and the VGT, rather than between the VGT and downstream emission control device. However, where pressure sensing is difficult to detect, or may be difficult to translate into emissions controls, the present invention determines diesel particulate filter conditions as a function of pressure differential across the filter and other conditions occurring during operation of the engine.

The diesel particulate filter restricts exhaust pressure in at least two ways. A filter element having a porous wall restricts the flow of exhaust, and becomes more restricting as soot and debris accumulate and close the pores of the filter media wall. In addition, the soot accumulates on the chamber walls enclosing the media and affects the flow through the chambers.

The change in pressure differential sensed across the diesel particulate filter by detector 188, such as differential pressure sensor 190 or two pressure sensors 196, 198 may be used to determine when cleaning, for example, a filter media change or a high temperature treatment of the soot to break it down into non-noxious components, is needed. The soot mass is based on the diesel particulate filter pressure differential as follows:

$$\Delta P = \frac{\mu Q}{2V_{trap}}(H+w)^2 \left[ \frac{w}{kH} + \frac{1}{2k_{soot}}\ln\left(\frac{H}{H-2w_s}\right) + \frac{4FL^2}{3}\left(\frac{1}{(H-2w_s)^4} + \frac{1}{H^4}\right) \right]$$

wherein:
the porous wall permeability k changes, depending on soot mass in the wall; and
the soot cake thickness may be computed from soot mass on the wall.

The permeability of a clean porous wall is shown as:

$$K_{clean\_wall} = SCF \cdot K_{0w},$$

wherein:

$$\text{Stokes-Cunningham factor } SCF = 1 + Kn(1.257 + 0.4e^{-1.1/Kn}),$$

and wherein:

$$\text{Knudsen number } Kn = \frac{2\lambda}{d_{pore}}, \text{ and}$$

$$\text{Gas mean-free-path } \lambda = v\sqrt{\frac{\pi M_w}{2RT}}.$$

As a result, the present invention yields a new formulation of soot cake permeability in a DPF, in which the soot cake permeability is not a constant. The permeability is a function of soot cake temperature ($K_t$) sensed during the time of soot formation/accumulation and of volumetric exhaust flow rate ($K_v$) or (space velocity):

$$K_o = C_o(K_t - K_v)$$

wherein $K_v$ is a function of mass flow rate, generally increasing as the volumetric exhaust flow rate (space velocity) increases in a convex manner, and, wherein $K_t$ is a function of soot cake temperature, generally, increasing as the Stokes-Cunningham factor (SCF) increases in a concave manner.

$$\text{The SCF} = 1 + C_1 T^{C_2}(C_3 + C_4 e^{C_5 T^{C_6}}).$$

wherein $C_0$, $C_1$, $C_2$, $C_3$, $C_4$, $C_5$, $C_6$ = Constants, and T=Soot cake temperature during its formation as measured or as computed in the ECM, for example, with the sensor 192 as an input.

In addition, a new formulation of diesel particulate filter (DPF) porous wall permeability has been developed, in which the clean porous wall permeability $K_{ow}$ is expressed as a function of pore diameter, exhaust gas temperature and of volumetric exhaust flow rate (space velocity):

$$K_{clean\_wall} = K_{ow}(1 + C_1 T^{C_2}(C_3 + C_4 e^{C_5 T^{C_6}}))$$

with
$K_{ow}$=f (volumetric exhaust flow rate or space velocity);
$C_1$, $C_2$, $C_3$, $C_4$, $C_5$, $C_6$=Constants; and
T=Exhaust gas temperature as measured, for example, at 194.

The parameter $K_{ow}$ generally decreases as the volumetric exhaust flow rate (or space velocity) increases in a concave manner. The constants may be determined empirically.

At least one, but preferably both, of the permeabilities can be relied upon to determine when DPF soot oxidation regeneration, as indicated at heater 181, ash removal, catalytic ash cleaning, filter replacement or other response must be performed subject to control of the ECM 20. A number of known processing strategies for performing these calculations may include event-driven, interrupt-driven, multi-tasking, multi-threading, parallel processing, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Preferably, control logic is implemented primarily in software which is executed by a microprocessor-based computer. Of course, the control logic may be implemented in software, hardware, or a combination of software and hardware. While not explicitly illustrated, one of ordinary skill in the art will recognize that various steps may be performed iteratively.

Corrective action may include the control reducing available engine torque, or regenerating the DPF with an incineration cleaning that reduces differential pressure across the filter. Exhaust pressure sensor 188 and tail pipe sensors 190, 196, 198 may provide information to the engine control module 20 that is used in controlling exhaust component regeneration. The exhaust manifold sensor 188 may provide information regarding NOx levels, air/fuel ratios (X), temperature, and pressure input to the ECM 20 to detect an impending need for regeneration. The ECM 20 may also monitor other engine operating parameters to determine the need for regeneration.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling an internal combustion engine to protect the engine from damage caused by excessive diesel particulate filter clogging, the method comprising:
sensing differential pressure change solely across said diesel particulate filter;
monitoring at least one of filter wall permeability by calculating $$K_w \text{ as } K_{ow}(1 + C_1 T^{C_2}(C_3 + C_4 e^{C_5 T^{C_6}}))$$

wherein $K_{ow}$=f (volumetric exhaust flow rate or space velocity);
$C_1$, $C_2$, $C_3$, $C_4$, $C_3$, $C_6$=Constants; and
T=Exhaust gas temperature as measured,
and variable soot cake permeability is determined by calculating $$K_{0c} \text{ as } C_0(K_t - K_v)$$

wherein $K_v$ is a function of mass flow rate, generally increasing as the volumetric exhaust flow rate (space velocity) increases in a convex manner, and, wherein $K_t$ is a function of soot cake temperature,
as a function of exhaust mass flow rate and exhaust temperature;
determining soot mass as a function of said sensing and said monitoring;
determining when said soot mass exceeds a threshold selected to reduce damage or regenerate the diesel particulate filter.

2. A system for controlling an internal combustion engine having an engine control module for initiating responses to detection of a need for unplugging of a diesel particulate filter, the system comprising:
a pressure detector fluidly coupled to the engine downstream of an exhaust manifold, wherein the pressure detector monitors differential pressure change across a diesel particulate filter only;
a monitor for at least one of filter wall permeability by calculating $$K_w \text{ as } K_{ow}(1 + C_1 T^{C_2}(C_3 + C_4 e^{C_5 T^{C_6}}))$$

wherein $K_{ow}$=f (volumetric exhaust flow rate or space velocity);
$C_1$, $C_2$, $C_3$, $C_4$, $C_5$, $C_6$=Constants; and
T=Exhaust gas temperature as measured,
and variable soot cake permeability is determined by calculating $$K_{0c} \text{ as } C_0(K_t - K_v)$$

wherein $K_v$ is a function of mass flow rate, generally increasing as the volumetric exhaust flow rate (space velocity) increases in a convex manner, and, wherein $K_t$ is a function of soot cake temperature, in a diesel particulate filter; and a determiner of soot mass level at or near at least one threshold of filter clogging.

3. The system as defined in claim 2 wherein said pressure detector is a differential pressure sensor.

4. The system as defined in claim 2 wherein said detector comprises a pressure sensor upstream of said diesel particulate filter and a pressure sensor downstream of said diesel particulate filter.

5. A computer readable storage medium having stored data representing instructions executable by a computer to control an internal combustion engine to protect the engine from damage caused by excessive clogging of diesel particulate filters, the computer readable storage medium comprising:

instructions for sensing differential pressure change only across said diesel particulate filter;

instructions for monitoring at least one of filter wall permeability by calculating $$K_w \text{ as } K_{ow}(1+C_1 T^{C_2}(C_3+C_4 e^{C_5 T^{C_6}}))$$

wherein $K_{ow}$=f (volumetric exhaust flow rate or space velocity);

$C_1, C_2, C_3, C_4, C_3, C_6$=Constants; and

T=Exhaust gas temperature as measured, and variable soot cake permeability is determined by calculating $$K_{0c} \text{ as } C_0(K_t-K_v)$$

wherein $K_v$ is a function of mass flow rate, generally increasing as the volumetric exhaust flow rate (space velocity) increases in a convex manner, and, wherein $K_t$ is a function of soot cake temperature; and instructions for determining soot mass as a function of said sensing and monitoring.

6. The computer readable storage system as defined in claim 5 further comprising instructions for heating the exhaust path of the engine.

7. A method for detecting the need for diesel particulate filter regeneration by:

determining at least one exhaust gas pressure differential only across a diesel particulate filter;

determining that at least one threshold of a filter wall permeability by calculating $$K_w \text{ as } K_{ow}(1+C_1 T^{C_2}(C_3+C_4 e^{C_5 T^{C_6}}))$$

wherein $K_{ow}$=f (volumetric exhaust flow rate or space velocity;

$C_1, C_2, C_3, C_4, C_3, C_6$=Constants; and

T=Exhaust gas temperature as measured, and variable soot cake permeability by calculating $$K_{0c} \text{ as } C_0(K_t-K_v)$$

wherein $K_v$ is a function of mass flow rate, generally increasing as the volumetric exhaust flow rate (space velocity) increases in a convex manner, and, wherein $K_t$ is a function of soot cake temperature; and generating at least one response signal triggering generation of at least one response to regenerate said diesel particulate filter.

* * * * *